Jan. 13, 1931.  G. E. GARNO ET AL  1,788,458
CHUCK
Filed May 25, 1928
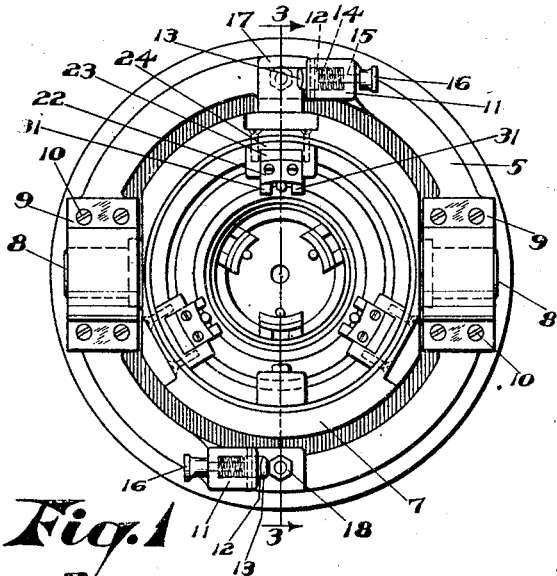
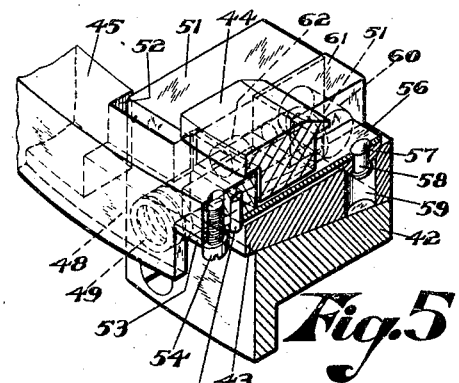
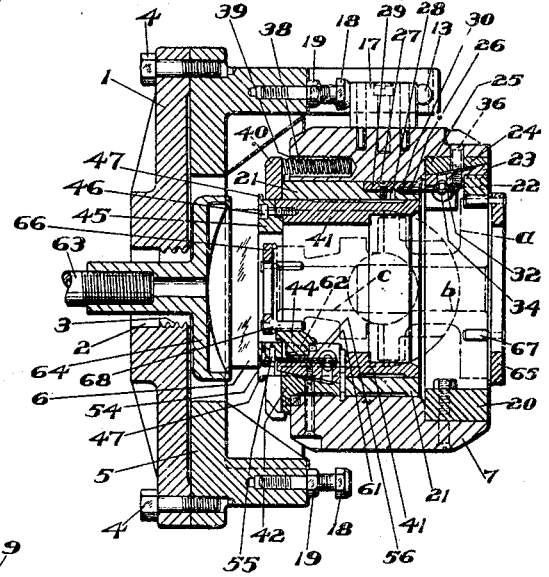
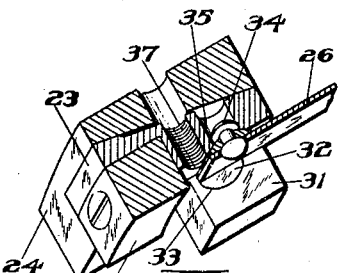
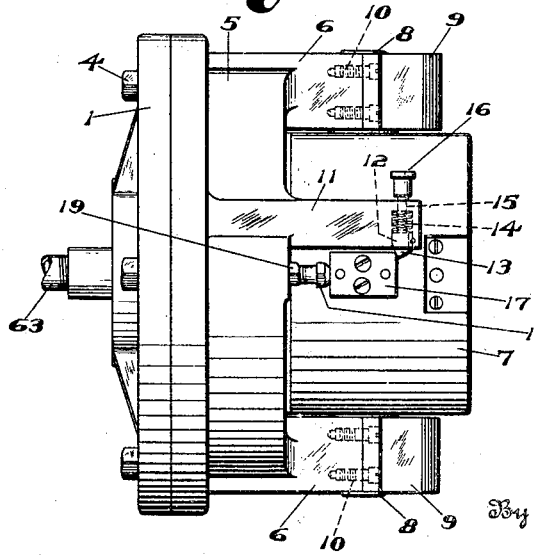
Inventor
George E. Garno
Eugene A. Engstrom
Geo. H. Kennedy Jr.
Attorney Patented Jan. 13, 1931

1,788,458

UNITED STATES PATENT OFFICE

GEORGE E. GARNO AND EUGENE A. ENGSTROM, OF WORCESTER, MASSACHUSETTS, ASSIGNORS TO THE HEALD MACHINE COMPANY, OF WORCESTER, MASSACHUSETTS, A CORPORATION OF MASSACHUSETTS

CHUCK

Application filed May 25, 1928. Serial No. 280,551.

The invention relates to chucks for use in grinding machines or other machine tools, when it is desired to operate upon work having a long bore that must be ground or otherwise machined. In the grinding art it has been found impracticable to grind a long bore at one operation by a given grinding wheel, since a long wheel spindle would be required, and long spindles are certain to spring under the grinding pressure, and are also subject to detrimental vibration set up by the rapid rotation of the grinding wheel.

In the internal grinding of workpieces having bores that are of considerable length relative to their diameters, therefore, the usual practice has been to perform two independent grinding operations on each workpiece, one from each end of the bore. Using an ordinary chuck for this purpose, it is necessary to spend considerable time in setting up the work in the chuck for the second operation, if the separately ground ends of the bore are to be in axial alinement. The chuck of the invention is designed to eliminate this time wasting setting up operation by providing means for swinging the workpiece through one hundred and eighty degrees while it is still held by the chuck jaws, thus to grind both ends of the bore pursuant to a single act of clamping the workpiece.

The attainment of the above, therefore, is one object of the invention. Another object of the invention is the provision, in a chuck of this character, of a double set of clamping jaws so that the workpiece may be held at both ends. A still further object of the invention is the provision of interconnected actuating means for the several sets of jaws, so that they may be operated from a single lever. Further objects of the invention reside in the means for holding the element that swings into two positions, in the features of adjustment, and the specific details of construction, all of which will more fully appear from the following description of an illustrative embodiment of the invention, taken in connection with the accompanying explanatory drawings, in which:—

Fig. 1 is a front elevation of a chuck constructed in accordance with the invention, Fig. 2 is a side elevation of the chuck after it has been rotated ninety degrees on its axis from the position in which it is shown in Fig. 1.

Fig. 3 is a longitudinal sectional view taken on the line 3—3 of Fig. 1.

Fig. 4 is a fragmentary isometric view of one of the jaws of the front set.

Fig. 5 is a view similar to Fig. 4, of one of the rear jaws and its actuating mechanism.

Like reference characters refer to like parts throughout the drawing.

The ordinary internal grinding machine provides a rotatably mounted spindle, driven by any suitable means, the work carrying chuck being mounted upon the front of said spindle. Referring first to Figs. 2 and 3, the chuck of the invention is adapted to be fastened to such a spindle, and to that end a base plate 1 of said chuck provides a central axial hole 2 which is internally threaded as at 3 to permit its attachment to the threaded front end of the spindle.

Fastened to the plate 1 in any suitable manner as by means of bolts 4, is an annular member 5 which, as best shown in Figs. 1 and 2, provides a pair of forwardly projecting portions 6, 6 which constitute supports for the rotatable mounting upon an axis perpendicular to the main axis of rotation, of the work clamping body which actually holds the workpiece. The work clamping body comprises an annular frame portion 7, in which are carried the several sets of jaws and actuating means therefor that will be described in detail hereinafter, said body 7 providing trunnions 8, 8 which are received in bearings formed partly in the forwardly extending portions 6, 6, and partly in bearing caps 9, 9 that are suitably fastened thereto as by means of screws 10.

As has already been indicated the axis of support of the work holding body 7 is perpendicular to the axis of rotation of the chuck as a whole which is, of course, determined by the axis of rotation of the chuck carrying spindle. It follows from the above that the two axes are located in a given plane. It is essential, not only that the foregoing conditions be fulfilled, but also that the journalling of the work carrying body 7 in the chuck be free from lost motion or bearing play. The above conditions being given, it will be evident that if a cylindrical or conical workpiece, or a workpiece having any surface of revolution, is so located in the work carrying body 7 that its axis (that is to say the axis of the workpiece) exactly coincides with the axis of rotation of the chuck, and the work carrying body 7 is then rotated through 180°, the said axis of the workpiece will be found to again coincide with the axis of rotation of the chuck. This is so because all three axes have a single point in common, and thus no lateral displacement of the axis of the workpiece is possible, while turning thereof through 180° will leave it with the same angular relationship to every other line that it had in the first place.

For the oscillation of the work holding body 7 through 180° on its lateral axis, (which is sometimes termed "indexing") and to hold it in the end positions securely without any possibility of vibration, yet allowing it to be released therefrom readily by the operator when desired, the following mechanism is provided.

As best shown in Figs. 1 and 2, the annular supporting member 5 of the chuck provides a pair of forwardly extending arms 11, 11. These arms 11, 11 are substantially diametrically opposed to each other on the chuck member 5, and serve for the support of locking devices to hold the body 7 in its two extreme positions. These locking devices preferably take the form of plungers 12, 12, which have beveled ends 13, 13 constituting latches, and which are surrounded by springs 14, 14 the plungers being reduced in diameter as shown at 15, 15 to receive the springs. The latter serve to press the latches 13, 13 outwardly into the path of co-operating means provided by the partially rotatable work holding body 7, while knobs 16, 16 are provided by the plungers, in order that the latches 13, 13 may be withdrawn from the path of said co-operating means.

Carried by the work holding body 7, and preferably spaced angularly on it substantially 90° from each of the trunnions 8, 8 is a rectangular block 17. This block constitutes the means that co-operates with the latches 13, 13 to hold the body in its two opposed positions, and it also constitutes an abutment to accurately locate the body 7 in these positions. For the latter purpose a pair of co-operating stops 18, 18 are provided by the annular member 5. As shown in Figs. 1 and 2, these stops 18, 18 are located adjacent the forwardly projecting arms 11, 11, and desirably take the form of screws or bolts in order that they shall be adjustable. Nuts 19, 19 are provided to secure the bolts or stops 18, 18 in the proper adjusted positions.

The flat sides of the block 17, when passing either one of the latches 13 force the same against the pressure of the corresponding spring 14, since the front faces of said latches have a gradual bevel relative to the aforesaid flat surfaces of the block, as shown. When, however, the then front face of the block 17 has passed beyond the tip of a particular latch 13, the back beveled edge of the latch is forced by the spring 14 against this front surface, and the angular relationship of these surfaces is such that the block 17 is pressed firmly against the stop 18 and cannot move therefrom, until the plunger is moved as by means of its knob 16. In order to balance the work holding body 7, a counterweight 20 is provided thereby opposite the block 17.

For the securing and releasing of workpieces in the work holding body 7 in accurate alinement with the axis of the chuck as a whole, the invention provides a double set of holding jaws, one at each end of said body, in order that the workpiece itself may be firmly held and not deformed under the grinding pressure. As illustrative of the utility of the chuck the workpiece $a$ shown in dotted lines in Fig. 3 is a cluster gear, cast or forged in a single piece, the bore of which must be ground concentrically with the pitch line of the several gear portions, the workpiece being consequently gripped by means of a pair of these gear portions. Referring now to Figs. 3 and 4, the work holding body 7 provides an internal cylindrical bore in which is slidably mounted a sleeve 21. A plurality of jaw pieces 22 (desirably three in number as is the usual practice in chucks) are detachably fastened to sliding blocks 23 that are located in guides 24 provided in recesses 25 formed in the internal periphery of one end of the body 7, flat springs 26 pressing the sliding members 23 against the guides. The flat springs 26 constitute links as well as spring means and at one end are fastened to the sleeve 21, as by means of a screw 27, a pin 28 passing through said sleeve, and a flat plate 29 provided to more securely hold the flat springs;—a clearance space 30 being provided on either side of the flat springs 26 near the front of the sleeve 21, to permit flexure of said springs.

At the other end the flat springs 26 are connected to the slidable members 23, and in order to allow for the inward movement of these jaw holding members, the connection is a pivoted one. For that purpose, the front ends of the springs 26 fit in rectangular slots defined by projecting portions 31, 31 provided by the members 23, and are fastened to slabbed off portions of cylindrical members 32 which fit in bearing holes 33 provided by the sides of the projections 31. The springs 26 are fastened to the members 32 by means of rivets 34, the heads of which extend into cylindrical holes 35. For the initial grinding of the jaws 22 to make them concentric to the axis of the chuck the sliding members 23 can be held rigid to the work holding body 7, as by means of screws 36, shown in Fig. 3, which are adapted to be screwed into tapped holes 37 provided by the members 23.

From the foregoing it will be obvious that when the sleeve 21 is urged rearwardly of the chuck to the position shown in Fig. 3, the slidable members 23 will be drawn into said chuck, and the jaws 22 consequently forced towards each other in a radial direction, owing to the inclined surfaces on the guides 24. The sleeve 21 is urged in this direction by means of a plurality of springs 38 fitting in holes 39 drilled in the body 7, the outer ends of said springs pressing against segments 40 which are suitably fastened to the sleeve 21. Before describing the means provided by the chuck to move said sleeve 21 against the pressure of the springs 38, the work holding jaws and actuating means therefor in the opposite end of the chuck will be described.

In a general way, the second set of jaws and actuating mechanism therefor embodies the same principles as those already decribed, but it should be noted at the outset that the inclined wedge means are inclined in the same direction in order that a given actuation of the parts may result in opening all the jaws or closing all the jaws, as the case may be. Referring now to Figs. 3 and 5, a second sleeve 41 is provided by the body 7, being mounted inside the sleeve 21 and fitting slidably therein. Both sleeves provide three slots at their left-hand ends, as viewed in Fig. 3, in order to allow three guide members 42 to be fastened to the body 7, and in order also to allow space for slidable members 43 that hold work holding jaws 44. The sleeve 41 has fastened thereto a ring 45, as by means of screws 46 (Fig. 3), said ring providing a flange 47 that overlaps the internal edge of the segments 40, and being recessed, as shown in dotted lines at 48 in Fig. 5, to provide flat surfaces against which coiled springs 49 press. The other ends of said coiled springs 49 contact with relatively stationary parts of the work holding device, in this instance the ends of blind holes provided by inwardly extending portions 51 of the guide members 42. These portions 51 constitute the sides of the guiding means for the jaw holding members 43, there being a pair of such portions provided by each guide member 42, and consequently the chuck may, and desirably does provide six of the springs 49 which are located in the portions 51 and press against the ring 45. The ring 45 provides slots or clearance spaces 52, as shown in Fig. 5, in order that it may be moved towards the portions 51 when it is desired to open the chuck jaws.

The ring 45 provides further slots 53 at the bottom of which are fastened, as by screws 54 and pins 55, flat springs 56 which, as in the case of the flat springs 26, constitute means not only to press the slidable members 43 against the guides 42, but act as links to draw them rearwardly of the chuck, or to press them forwardly in response to the actuation of the ring 45. The link springs 56 are fastened at the other end to the members 43 in exactly the same manner as the links 26 were fastened to the slidable members 23, this means comprising cylindrical members 57, rivets 58, and cylindrical holes 59, together with bearing holes 60 to rotatably hold the cylindrical members. The slidable members 43 provide radial inwardly extending portions 61, 61 to which are fastened, as by means of screws 62, the jaw pieces 44.

Slidably mounted in the hollow work rotating spindle, that holds the chuck of the invention, is a hollow shaft 63 that at once serves for the conveying of coolant to the workpiece $a$ being ground, and as a means of opening and closing the chuck. When the work holding body 7 is in the position shown in Fig. 3, forward movement of the rod 63 results in opening the several sets of jaws, by the impingement of a cup shaped member 64 against the ring 45. Such movement results in forward movement first of the ring 45, and therefore the sliding members 43, and jaws 44, followed by forward movement of the jaw pieces 22 as soon as the flanges 47 have contacted with and moved the segments 40, the sleeve 21, and consequently the flat springs 26. It will be apparent that the rear set of jaws 44 will be opened first, and in the subsequent closing of the chuck upon a workpiece $a$ when the push rod 63 is released, they will be, therefore, the last to engage the workpiece.

When using the chuck of the invention in a grinding or other machine, the operator first positions the workholder body 7 in the position shown by Figs. 1, 2 and 3, so that the ring 45 is just in front of the annular edge of the cup shaped member 64. Having made sure that the corresponding latch 13 is in engagement with the front face of the block 17, the operator moves the chuck operating lever, not shown, provided by the machine which moves the shaft 63 forwardly in the spindle, causing engagement of the operating member 64 with the ring 45, pressing this ring against the several springs 49 and ultimately pressing the segments 40 against the springs 38; the sleeves 21 and 41 being thus moved to the right, Fig. 3, and the slidable members 23 and 43 being moved in the same direction to open both sets of jaws 22 and 44.

The operator then places the workpiece $a$ in the chuck and releases the chuck operating lever whereupon both sets of jaws 22 and 44 grip the workpiece and hold it in centered position. For the proper holding of a cluster gear $a$ such as shown in Fig. 3, rings 65 and 66 are provided, each one of which loosely holds three pins 67 and 68 respectively, the said pins being of a size to fit between the teeth of the end gear portions substantially in engagement with the pitch line of said gear portions. The jaws 22 and 44 actually engage these pins instead of the gears themselves.

The bore $b$ of the workpiece can now be ground in the usual manner, and when this grinding operation is finished the work holding body 7 can be rotated or "indexed" 180° to bring the block 17 in engagement with the opposite stop 18, and the bore $c$ can then be ground, all without in any way disturbing the setting and clamping of the workpiece $a$ in the body 7. Both bores $b$ and $c$ having thus been ground concentric with the common axis of the pitch lines of the end gear portions, the work holding body 7 should then be turned back to its original position as shown in Fig. 3, and by operation of the chuck operating lever the cup shaped member can then be forced into engagement with the ring 45, which again spreads the jaws 22 and 44, allowing the finished workpiece to be removed from the machine and another one inserted in its place.

We claim,

1. In apparatus of the class described, a chucking member adapted to be rotated through 180° to successively present opposite ends of a workpiece therein to a cutting tool, a set of work-clamping jaws at each end of said member, a pair of sleeves, one inside the other connected to said several sets of jaws, a lost motion connection between said sleeves, and wedge means to cause the jaws to open or close upon movement of said sleeves in a given direction, whereby by the use of a single operating member said jaws may be simultaneously opened or closed, one set of jaws moving before the other set by reason of said lost motion connection.

2. In a chuck, a workholding body, a base adapted to be attached to a spindle, a pivotal mounting for said workholding body in said base, the pivotal axis being perpendicular to the axis of rotation of the spindle and base, a set of slidable jaws in said workholding body adapted to hold a workpiece therein when moved generally parallel to the main axis of the chuck, a jaw actuating member, and a longitudinally movable member passing into the base normally separate from the jaw-actuating member but adapted to be urged into engagement with it to actuate said jaws when the workholding body is in one position.

3. In a chuck, a base adapted to be attached to a spindle for rotation about an axis, a workholding body pivotally mounted in said base on an axis perpendicular to the axis of rotation of said base, said workholding body comprising an annular member, a set of workholding jaws movable generally parallel to the geometrical axis of the workholding body, wedge means cooperating with said jaws to cause them to grip a workpiece when moved in one direction, spring means urging them in this direction, and a longitudinally movable member projecting through the base normally disconnected from said jaws but adapted, when pushed forward, to cause the jaws to release a workpiece.

4. In a chuck, a base adapted to be fastened to a spindle and therefore to be revolved on an axis, a workholding body comprising an annular member mounted for partial rotation in said base on a line perpendicular to the axis of rotation of said base and also to its own geometric axis, two sets of jaw members movable in a line generally parallel to the geometric axis of said annular member, wedge means to cause the jaws of each set to clamp a workpiece when moved in one direction, separate spring means associated with each set of jaw members to move them in said direction, and means in said base normally totally disconnected from said jaw members but adapted to be urged towards them when the chuck is in one extreme position of oscillation to cause opening of said jaws, for the release of the workpiece.

5. In a chuck, a base adapted to be fastened to a spindle and therefore to be revolved on an axis, a workholding body comprising an annular member mounted for partial rotation in said base on a line perpendicular to the axis of rotation of said base and also to its own geometric axis, a set of jaw members at each end of said annular member, cooperating wedge means at each end of said annular member arranged to cause the jaw members to move towards the center of the annular member by a longitudinal movement thereof in a given direction for all the jaw members, a pair of concentric sleeves, one inside the other, each sleeve having connections with the separate jaw members of a set, the two sleeves thus controlling both sets of jaw members, spring means in the annular member, and longitudinally movable means in the chuck base, the latter being normally disconnected from the sleeves, and the last two means serving to urge the sleeves in one direction to open the chuck and in the other direction to close it.

6. In apparatus as claimed in claim 5, two separate sets of spring means, one set for each sleeve, whereby to hold a workpiece at both ends of the chuck with a separate adjustable action, the longitudinally movable means being adapted, in one position of the annular member to release all the jaws.

GEORGE E. GARNO.
EUGENE A. ENGSTROM.